(12) United States Patent
Chen

(10) Patent No.: US 11,880,019 B2
(45) Date of Patent: Jan. 23, 2024

(54) CAMERA OPTICAL LENS

(71) Applicant: AAC Optics (Suzhou) Co., Ltd., Suzhou (CN)

(72) Inventor: Jia Chen, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 623 days.

(21) Appl. No.: 17/137,430

(22) Filed: Dec. 30, 2020

(65) Prior Publication Data

US 2022/0137360 A1    May 5, 2022

(30) Foreign Application Priority Data

Oct. 30, 2020  (CN) .......................... 202011192710.0

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01)

(58) Field of Classification Search
CPC .. G02B 13/0045; G02B 9/64; G02B 15/1461; G02B 13/06; G02B 13/18; G02B 27/0025; G03B 17/17; G03B 30/00
See application file for complete search history.

(56) References Cited

U.S. PATENT DOCUMENTS

| 2013/0242175 | A1* | 9/2013 | Kuzuhara | G02B 27/646 348/360 |
| 2014/0118605 | A1* | 5/2014 | Kawamura | G02B 15/20 359/683 |
| 2019/0107690 | A1* | 4/2019 | Wenren | G02B 13/0045 |
| 2020/0057269 | A1* | 2/2020 | Teranishi | G02B 9/62 |

* cited by examiner

*Primary Examiner* — Mustak Choudhury
(74) *Attorney, Agent, or Firm* — W&G Law Group

(57) ABSTRACT

The present disclosure provides a camera optical lens including, from an object side to an image side in sequence: a first lens, a second lens, a third lens, a fourth lens, a fifth lens, a sixth lens, a seventh lens, and an eighth lens; wherein the first lens has a positive refractive power, and the camera optical lens satisfies conditions of: $0.95 \leq f/TTL$; $3.20 \leq f2/f \leq 5.00$; and $0.30 \leq (R7+R8)/(R7-R8) \leq 1.00$. The camera optical lens can achieve good optical performance while meeting the design requirements for large aperture, ultra-thinness and long focal length.

10 Claims, 7 Drawing Sheets

CAMERA OPTICAL LENS

TECHNICAL FIELD

The present disclosure relates to the field of optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece, four-piece, or even five-piece or six-piece lens structure. However, with the development of technology and the increase of the diverse demands of users, and as the pixel area of photosensitive devices is becoming smaller and smaller and the requirement of the system on the imaging quality is improving constantly, the eight-piece lens structure gradually appears in lens designs. Although the typical eight-piece lens already has good optical performance, its optical power, lens spacing and lens shape remain unreasonable to some extents, resulting in that the lens structure, which, even though, has excellent optical performance, is not able to meet the design requirement for large aperture, ultra-thinness and long focal length.

Thus, there is a need to provide a camera optical lens having excellent optical performance and meeting the design requirement for large aperture, long focal length and ultra-thinness.

SUMMARY

To address the above issues, an object of the present disclosure is to provide a camera optical lens that meets a design requirement of large aperture, ultra-thinness and long focal length while having excellent optical performance.

The technical solution of the present disclosure is as follows. A camera optical lens is provided, including, from an object side to an image side in sequence: a first lens, a second lens, a third lens, a fourth lens, a fifth lens, a sixth lens, a seventh lens, and an eighth lens; the first lens has a positive refractive power, and the camera optical lens satisfies conditions of: $0.95 \leq f/TTL$; $3.20 \leq f2/f \leq 5.00$; and $0.30 \leq (R7+R8)/(R7-R8) \leq 1.00$; where f denotes a focal length of the camera optical lens; f2 denotes a focal length of the second lens; R7 denotes a central curvature radius of an object-side surface of the fourth lens; R8 denotes a central curvature radius of an image-side surface of the fourth lens; and TTL denotes a total optical length from an object-side surface of the first lens to an image surface of the camera optical lens along an optical axis.

As an improvement, the camera optical lens further satisfies a condition of: $-6.00 \leq R16/R15 \leq -2.50$; where R15 denotes a central curvature radius of an object-side surface of the eighth lens; and R16 denotes a central curvature radius of an image-side surface of the eighth lens.

As an improvement, the camera optical lens further satisfies conditions of: $0.34 \leq f1/f \leq 1.06$; $-2.75 \leq (R1+R2)/(R1-R2) \leq -0.87$; and $0.06 \leq d1/TTL \leq 0.18$; where f1 denotes a focal length of the first lens; R1 denotes a central curvature radius of the object-side surface of the first lens; R2 denotes a central curvature radius of an image-side surface of the first lens; and d1 denotes an on-axis thickness of the first lens.

As an improvement, the camera optical lens further satisfies conditions of: $-9.29 \leq (R3+R4)/(R3-R4) \leq -1.81$; and $0.02 \leq d3/TTL \leq 0.06$; where R3 denotes a central curvature radius of the object-side surface of the second lens; R4 denotes a central curvature radius of the image-side surface of the second lens; and d3 denotes an on-axis thickness of the second lens.

As an improvement, the camera optical lens further satisfies conditions of: $-2.55 \leq f3/f \leq -0.82$; $0.70 \leq (R5+R6)/(R5-R6) \leq 2.16$; and $0.02 \leq d5/TTL \leq 0.07$; where f3 denotes a focal length of the third lens; R5 denotes a central curvature radius of an object-side surface of the third lens; R6 denotes a central curvature radius of an image-side surface of the third lens; and d5 denotes an on-axis thickness of the third lens.

As an improvement, the camera optical lens further satisfies conditions of: $-15.56 \leq f4/f \leq -3.83$; and $0.03 \leq d7/TTL \leq 0.08$; where f4 denotes a focal length of the fourth lens; and d7 denotes an on-axis thickness of the fourth lens.

As an improvement, the camera optical lens further satisfies following conditions: $3.48 \leq f5/f \leq 11.42$; $-23.06 \leq (R9+R10)/(R9-R10) \leq -6.45$; and $0.03 \leq d9/TTL \leq 0.10$; where f5 denotes a focal length of the fifth lens; R9 denotes a central curvature radius of an object-side surface of the fifth lens; R10 denotes a central curvature radius of an image-side surface of the fifth lens; and d9 denotes an on-axis thickness of the fifth lens.

As an improvement, the camera optical lens further satisfies a condition of: $6.68 \leq f6/f \leq 21.63$; $5.03 \leq (R11+R12)/(R11-R12) \leq 17.91$; and $0.02 \leq d11/TTL \leq 0.07$; where f6 denotes a focal length of the sixth lens; R11 denotes a central curvature radius of an object-side surface of the sixth lens; R12 denotes a central curvature radius of an image-side surface of the sixth lens; and d11 denotes an on-axis thickness of the sixth lens.

As an improvement, the camera optical lens further satisfies a condition of: $1.42 \leq f7/f \leq 4.86$; $1.08 \leq (R13+R14)/(R13-R14) \leq 3.46$; and $0.02 \leq d13/TTL \leq 0.07$; where f7 denotes a focal length of the seventh lens; R13 denotes a central curvature radius of an object-side surface of the seventh lens; R14 denotes a central curvature radius of an image-side surface of the seventh lens; and d13 denotes an on-axis thickness of the seventh lens.

As an improvement, the camera optical lens further satisfies a condition of: $-1.72 \leq f8/f \leq -0.55$; $-1.41 \leq (R15+R16)/(R15-R16) \leq -0.29$; and $0.04 \leq d15/TTL \leq 0.12$; where f8 denotes a focal length of the eighth lens; R15 denotes a central curvature radius of an object-side surface of the eighth lens; R16 denotes a central curvature radius of an image-side surface of the eighth lens; and d15 denotes an on-axis thickness of the eighth lens.

The present disclosure is advantageous in: the camera optical lens in the present disclosure has good optical performance and has characteristics of large aperture, long focal length and ultra-thinness, and is especially applicable to mobile phone camera lens assemblies and WEB camera lenses composed by such camera elements as CCD and CMOS for high pixels.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF EMBODIMENTS

The present disclosure will be further described below with reference to the drawings and embodiments.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
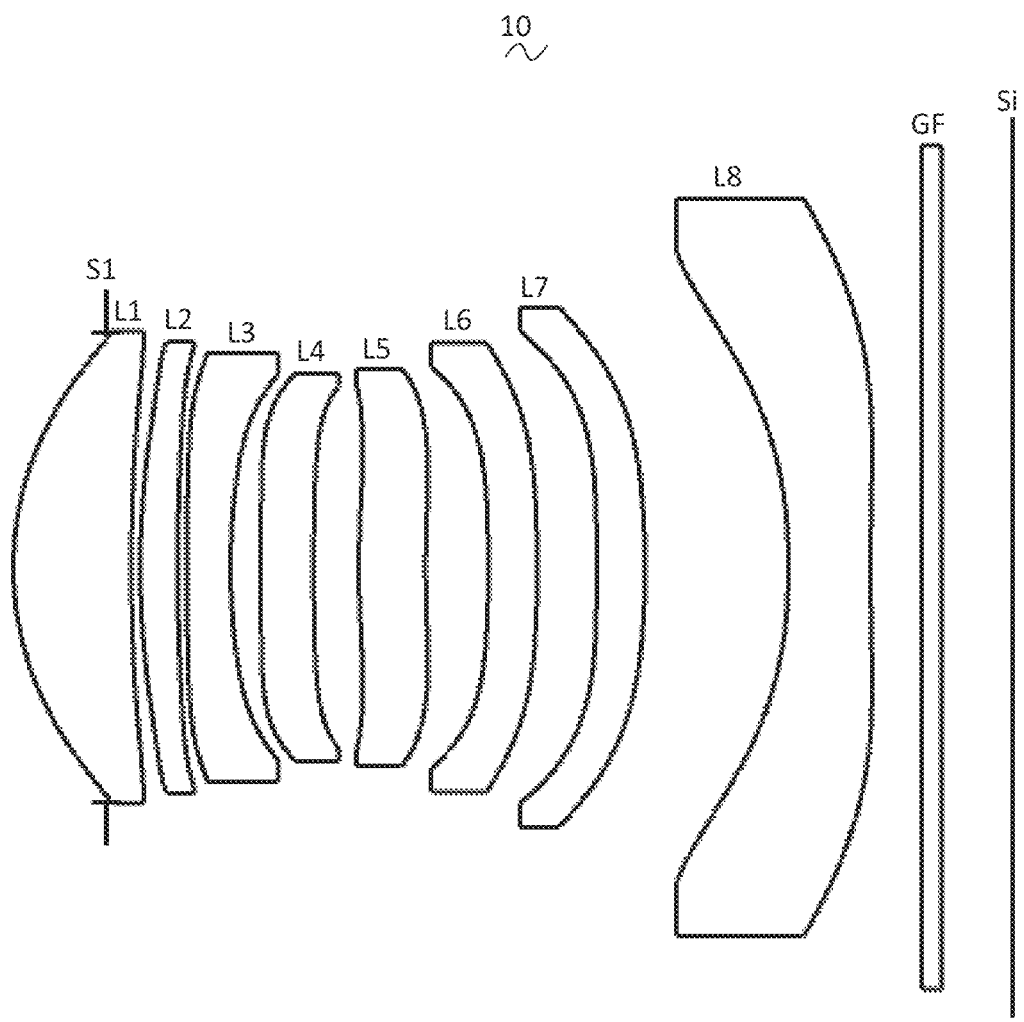
FIG. 1 is a schematic diagram of a structure of a camera optical lens according to Embodiment 1 of the present disclosure.

Referring to the accompanying drawing, the present disclosure provides a camera optical lens 10. FIG. 1 shows a camera optical lens 10 of Embodiment 1 of the present disclosure. In FIG. 1, an object side refers to the left side, an image side refers to the right side, and the camera optical lens 10 includes eight lenses, from the object side to the image side in sequence: an aperture S1, a first lens L1, a second lens L2, a third lens L3, a fourth lens L4, a fifth lens L5, a sixth lens L6, a seventh lens L7 and an eighth lens L8.

An optical element such as an optical filter GF can be arranged between the eighth lens L8 and an image surface Si.

In this embodiment, the first lens L1, the second lens L2, the third lens L3, the fourth lens L4, the fifth lens L5, the sixth lens L6, the seventh lens L7 and the eighth lens L8 are made of plastic material. In other embodiments, the lenses may be made of other material.

In this embodiment, the first lens L1 has a positive refractive power, the second lens L2 has a positive refractive power, the third lens L3 has a negative refractive power, the fourth lens L4 has a negative refractive power, the fifth lens L5 has a positive refractive power, the sixth lens L6 has a positive refractive power, the seventh lens L7 has a positive refractive power and the eighth lens L8 has a negative refractive power. It should be appreciated that, in other embodiments, the third lens L3, the fourth lens L4, the fifth lens L5, the sixth lens L6, the seventh lens L7 and the eighth lens L8 may have other refractive powers than those of this embodiment.

In this embodiment, the first lens L1 has a positive refractive power, which facilitates improving performance of the camera optical lens.

In this embodiment, a focal length of the camera optical lens 10 is defined as f, a focal length of the second lens L2 is defined as f2, a central curvature radius of the object-side surface of the fourth lens L4 is defined as R7, a central curvature radius of the image-side surface of the fourth lens L4 is defined as R8 and a total optical length from the object-side surface of the first lens L1 to an image surface S1 of the camera optical lens 10 along an optical axis is defined as TTL. The camera optical lens 10 satisfies conditions of:

$$0.95 \leq f/TTL; \quad (1)$$

$$3.20 \leq f2/f \leq 5.00; \text{ and} \quad (2)$$

$$0.30 \leq (R7+R8)/(R7-R8) \leq 1.00. \quad (3)$$

Condition (1) specifies a ratio of the focal length of the camera optical lens 10 and the total optical length of the camera optical lens 10. Given a same total optical length TTL, the camera optical lens 10 has the focal length longer.

Condition (2) specifies a ratio of the focal length of the second lens L2 to the focal length of the camera optical lens 10. Within this condition, a spherical aberration and a field curvature of the camera optical lens can be effectively balanced.

Condition (3) specifies a shape of the fourth lens L4. Within this condition, the deflection degree of the light passing through the lens can be alleviated, and the aberration can be effectively reduced.

A central curvature radius of the object-side surface of the eighth lens L8 is defined as R15, and a central curvature radius of the image-side surface of the eighth lens L8 is defined as R16. The camera optical lens 10 satisfies a condition of $-6.00 \leq R16/R15 \leq -2.50$, which specifies a shape of the eighth lens L8. Within this condition, correction of the off-axis aberration is facilitated.

In this embodiment, the first lens L1 includes an object-side surface being convex in a paraxial region and an image-side surface being concave in the paraxial region.

The focal length of the camera optical lens 10 is defined as f, and a focal length of the first lens is defined as f1. The camera optical lens 10 satisfies a condition of $0.34 \leq f1/f \leq 1.06$, which specifies a ratio of the focal length of the first lens L1 to the focal length of the camera optical lens 10. Within this condition, the first lens L1 has an appropriate positive refractive power, and the correction of the aberration of the camera optical lens is facilitated. Preferably, the camera optical lens 10 satisfies a condition of $0.54 \leq f1/f \leq 0.85$.

A central curvature radius of an object-side surface of the first lens L1 is defined as R1, and a central curvature radius of an image-side surface of the first lens L1 is defined as R2. The camera optical lens 10 satisfies a condition of $-2.75 \leq (R1+R2)/(R1-R2) \leq -0.87$. This can reasonably control a shape of the first lens L1 in such a manner that the first lens L1 can effectively correct a spherical aberration of the camera optical lens. Preferably, the camera optical lens 10 satisfies a condition of $-1.72 \leq (R1+R2)/(R1-R2) \leq -1.09$.

An on-axis thickness of the first lens L1 is defined as d1 and the total optical length of the camera optical lens 10 is defined as TTL. The camera optical lens 10 satisfies a condition of $0.06 \leq d1/TTL \leq 0.18$. Within this condition, ultra-thinness of the lenses is facilitated. Preferably, the camera optical lens 10 satisfies a condition of $0.09 \leq d1/TTL \leq 0.14$.

In this embodiment, the second lens L2 includes an object-side surface being convex in a paraxial region and an image-side surface being concave in the paraxial region.

A central curvature radius of the object-side surface of the second lens L2 is defined as R3, and a central curvature radius of the image-side surface of the second lens L2 is defined as R4. The camera optical lens 10 satisfies a condition of $-9.29 \leq (R3+R4)/(R3-R4) \leq -1.81$, which specifies a shape of the second lens L2. Within this condition, correction of the on-axis chromatic aberration is facilitated. Preferably, the camera optical lens 10 satisfies a condition of $-5.81 \leq (R3+R4)/(R3-R4) \leq -2.27$.

An on-axis thickness of the second lens L2 is defines as d3, and the total optical length of the camera optical lens 10 is defined as TTL. The camera optical lens 10 satisfies a condition of $0.02 \leq d3/TTL \leq 0.06$. Within this condition, ultra-thinness of the lenses is facilitated. Preferably, the camera optical lens 10 satisfies a condition of $0.03 \leq d3/TTL \leq 0.05$.

In this embodiment, the third lens L3 includes an object-side surface being convex in a paraxial region and an image-side surface being concave in the paraxial region.

A focal length of the third lens L3 is defined as f3, and the focal length of the camera optical lens 10 is defined as f. The camera optical lens 10 satisfies a condition of $-2.55 \leq f3/f \leq -0.82$. With reasonable distribution of the refractive power, the camera optical lens has better imaging quality and lower sensitivity. Preferably, the camera optical lens 10 satisfies a condition of $-1.59 \leq f3/f \leq -1.03$.

A central curvature radius of the object-side surface of the third lens L3 is defined as R5, and a central curvature radius of the image-side surface of the third lens L3 is defined as R6. The camera optical lens 10 satisfies a condition of $0.70 \leq (R5+R6)/(R5-R6) \leq 2.16$, which specifies a shape of the third lens L3. Within this condition, the deflection degree of the light passing through the lens can be alleviated, and the aberration can be effectively reduced. Preferably, the camera optical lens 10 satisfies a condition of $1.12 \leq (R5+R6)/(R5-R6) \leq 1.73$.

An on-axis thickness of the third lens L3 is defined as d5, and the total optical length of the camera optical lens 10 is defined as TTL. The camera optical lens 10 satisfies a condition of $0.02 \leq d5/TTL \leq 0.07$. Within this condition, ultra-thinness of the lenses is facilitated. Preferably, the camera optical lens 10 satisfies a condition of $0.03 \leq d5/TTL \leq 0.05$.

In this embodiment, the fourth lens L4 includes an object-side surface being concave in a paraxial region and an image-side surface being concave in the paraxial region.

A focal length of the fourth lens L4 is defined as f4, and the focal length of the camera optical lens 10 is defined as f. The camera optical lens 10 satisfies a condition of $-15.56 \leq f4/f \leq -3.83$, which specifies a ratio of the focal length of the fourth lens L4 and the focal length of the camera optical lens 10. Within this condition, improvement of the performance of the camera optical lens is facilitated. Preferably, the camera optical lens 10 satisfies a condition of $-9.73 \leq f4/f \leq -4.79$.

An on-axis thickness of the fourth lens L4 is defined as d7, and the total optical length of the camera optical lens 10 is defined as TTL. The camera optical lens 10 satisfies a condition of $0.03 \leq d7/TTL \leq 0.08$. Within this condition, ultra-thinness of the lenses is facilitated. Preferably, the camera optical lens 10 satisfies a condition of $0.04 \leq d7/TTL \leq 0.06$.

In this embodiment, the fifth lens L5 includes an object-side surface being convex in a paraxial region and an image-side surface being concave in the paraxial region.

A focal length of the fifth lens L5 is defined as f5 and the focal length of the camera optical lens 10 is defined as f. The camera optical lens 10 satisfies a condition of $3.48 \leq f5/f \leq 11.42$, which specifies the fifth lens L5 so as to enable the light angle of the camera optical lens 10 to be gradual and reduce the tolerance sensitivity. Preferably, the camera optical lens 10 satisfies a condition of $5.56 \leq f5/f \leq 9.14$.

A central curvature radius of the object-side surface of the fifth lens L5 is defined as R9, and a central curvature radius of the image-side surface of the fifth lens L5 is defined as R10. The camera optical lens 10 satisfies a condition of $-23.06 \leq (R9+R10)/(R9-R10) \leq -6.45$, which specifies a shape of the fifth lens L5. Within this condition, the correction of the off-axis aberration is facilitated. Preferably, the camera optical lens 10 satisfies a condition of $-14.41 \leq (R9+R10)/(R9-R10) \leq -8.07$.

An on-axis thickness of the fifth lens L5 is defined as d9, and the total optical length of the camera optical lens 10 is defined as TTL. The camera optical lens 10 satisfies a condition of $0.03 \leq d9/TTL \leq 0.10$. Within this condition, ultra-thinness of the lenses is facilitated. Preferably, the camera optical lens 10 satisfies a condition of $0.05 \leq d9/TTL \leq 0.08$.

In this embodiment, the sixth lens L6 includes an object-side surface being concave in a paraxial region and an image-side surface being convex in the paraxial region.

The focal length of the camera optical lens 10 is defined as f, and a focal length of the sixth lens L6 is defined as f6. The camera optical lens 10 satisfies a condition of $6.68 \leq f6/f \leq 21.63$. With reasonable distribution of the refractive power, the camera optical lens has better imaging quality and lower sensitivity. Preferably, the camera optical lens 10 satisfies a condition of $10.69 \leq f6/f \leq 17.31$.

A central curvature radius of an object-side surface of the sixth lens L6 is defined as R11, and a central curvature radius of an image-side surface of the sixth lens L6 is defined as R12. The camera optical lens 10 satisfies a condition of $5.03 \leq (R11+R12)/(R11-R12) \leq 17.91$, which specifies a shape of the sixth lens L6. Within this condition, correction of the off-axis aberration is facilitated. Preferably, the camera optical lens 10 satisfies a condition of $8.05 \leq (R11+R12)/(R11-R12) \leq 14.33$.

An on-axis thickness of the sixth lens L6 is defined as d11, and the total optical length of the camera optical lens 10 is defined as TTL. The camera optical lens 10 satisfies a condition of $0.02 \leq d11/TTL \leq 0.07$. Within this condition, ultra-thinness of the lenses is facilitated. Preferably, the camera optical lens 10 satisfies a condition of $0.04 \leq d11/TTL \leq 0.06$.

In this embodiment, the seventh lens L7 includes an object-side surface being concave in a paraxial region and an image-side surface being convex in the paraxial region.

The focal length of the camera optical lens 10 is defined as f, and a focal length of the seventh lens L7 is defined as f7. The camera optical lens 10 satisfies a condition of $1.42 \leq f7/f \leq 4.86$. With reasonable distribution of the refractive power, the camera optical lens has better imaging quality and lower sensitivity. Preferably, the camera optical lens 10 satisfies a condition of $2.27 \leq f7/f \leq 3.89$.

A central curvature radius of the object-side surface of the seventh lens L7 is defined as R13, and a central curvature radius of the image-side surface of the seventh lens L7 is defined as R14. The camera optical lens 10 satisfies a condition of $1.08 \leq (R13+R14)/(R13-R14) \leq 3.46$, which specifies a shape of the seventh lens L7. Within this condition, correction of the off-axis aberration is facilitated. Preferably, the camera optical lens 10 satisfies a condition of $1.73 \leq (R13+R14)/(R13-R14) \leq 2.76$.

An on-axis thickness of the seventh lens L7 is defined as d13, and the total optical length of the camera optical lens 10 is defined as TTL. The camera optical lens 10 satisfies a condition of $0.02 \leq d13/TTL \leq 0.07$. Within this condition, ultra-thinness of the lenses is facilitated. Preferably, the camera optical lens 10 satisfies a condition of $0.04 \leq d13/TTL \leq 0.06$.

In this embodiment, the eighth lens L8 includes an object-side surface being concave in a paraxial region and an image-side surface being concave in the paraxial region.

The focal length of the camera optical lens 10 is defined as f, and a focal length of the eighth lens L8 is defined as f8. The camera optical lens 10 satisfies a condition of $-1.72 \leq f8/f \leq -0.55$. With reasonable distribution of the refractive power, the camera optical lens has better imaging quality and lower sensitivity. Preferably, the camera optical lens 10 satisfies a condition of $-1.07 \leq f8/f \leq -0.69$.

The central curvature radius of the object-side surface of the eighth lens L8 is defined as R15, and the central curvature radius of the image-side surface of the eighth lens L8 is defined as R16. The camera optical lens 10 satisfies a condition of $-1.41 \leq (R15+R16)/(R15-R16) \leq -0.29$, which specifies a shape of the eighth lens L8. Within this condition, the development of the lenses towards ultra-thinness would facilitate correcting the off-axis aberration. Preferably, the camera optical lens 10 satisfies a condition of $-0.88 \leq (R15+R16)/(R15-R16) \leq -0.37$.

An on-axis thickness of the eighth lens L8 is defined as d15, and the total optical length of the camera optical lens 10 is defined as TTL. The camera optical lens 10 satisfies a condition of $0.04 \leq d15/TTL \leq 0.12$. Within this condition, ultra-thinness of the lenses is facilitated. Preferably, the camera optical lens 10 satisfies a condition of $0.06 \leq d15/TTL \leq 0.10$.

It should be appreciated that, in other embodiments, configuration of the object-side surfaces and the image-side surfaces of the first lens L1, the second lens L2, the third lens L3, the fourth lens L4, the fifth lens L5, the sixth lens L6, the seventh lens L7 and the eighth lens L8 may have a distribution in convex and concave other than that of the above-discussed embodiment.

In this embodiment, an F number of the camera optical lens 10 is defined as FNO, and the camera optical lens 10 satisfies a condition of $FNO \leq 2.00$. This facilitates achieving large aperture and excellent imaging performance of the camera optical lens 10.

In this embodiment, the total optical length of the camera optical lens 10 is defined as TTL, and an image height of the camera optical lens 10 is defined as IH. The camera optical lens 10 satisfies a condition of $TTL/IH \leq 2.17$, which facilitates ultra-thinness of the lenses.

In this embodiment, the focal length of the camera optical lens 10 is defined as f, and the image height of the camera optical lens 10 is defined as IH. The camera optical lens 10 satisfies a condition of $f/IH \geq 2.09$, which facilitates achieving long focal length.

In this embodiment, the focal length of the camera optical lens 10 is defined as f, and a combined focal length of the first lens L1 and of the second lens L2 is defined as f12. The camera optical lens 10 satisfies a condition of $0.30 \leq f12/f \leq 0.92$. Within this condition, the aberration and distortion of the camera optical lens 10 can be eliminated and a back focal length of the camera optical lens is reduced, thereby maintaining miniaturization of the camera optical lens. Preferably, the camera optical lens 10 satisfies a condition of $0.47 \leq f12/f \leq 0.73$.

When the focal length of the camera optical lens 10 as well as the focal length and central curvature radius of each lens satisfy the above relationships, the camera optical lens 10 meets the design requirements of large aperture, ultra-thinness and long focal length while having excellent optical imaging performance. Based on the characteristics of the camera optical lens 10, the camera optical lens 10 is particularly applicable to mobile camera lens assemblies and a WEB camera lenses composed of such camera elements as CCD and CMOS for high pixels.

The camera optical lens 10 will be further described with reference to the following examples. Symbols used in various examples are shown as follows. The focal length, on-axis distance, central curvature radius, on-axis thickness, inflexion point position, and arrest point position are all in units of mm.

TTL: Total optical length (the distance from the object-side surface of the first lens L1 to the image surface S1 of the camera optical lens along the optical axis) in mm.

FNO: ratio of an effective focal length and an entrance pupil diameter of the camera optical lens.

In addition, inflexion points and/or arrest points can be arranged on at least one of the object-side surface and/or the image-side surface of each lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R |  | d | nd |  | vd |
|---|---|---|---|---|---|---|
| S1 | ∞ | d0= | −0.503 |  |  |  |
| R1 | 1.743 | d1= | 0.638 | nd1 | 1.5444 v1 | 55.82 |
| R2 | 11.418 | d2= | 0.050 |  |  |  |
| R3 | 5.288 | d3= | 0.200 | nd2 | 1.5444 v2 | 55.82 |
| R4 | 9.390 | d4= | 0.052 |  |  |  |
| R5 | 20.433 | d5= | 0.234 | nd3 | 1.6701 v3 | 19.39 |
| R6 | 3.684 | d6= | 0.166 |  |  |  |
| R7 | −18563.854 | d7= | 0.284 | nd4 | 1.5444 v4 | 55.82 |
| R8 | 18.656 | d8= | 0.245 |  |  |  |
| R9 | 4.951 | d9= | 0.362 | nd5 | 1.6400 v5 | 23.54 |
| R10 | 6.092 | d10= | 0.337 |  |  |  |
| R11 | −11.021 | d11= | 0.266 | nd6 | 1.6701 v6 | 19.39 |

TABLE 1-continued

| | R | d | | nd | vd |
|---|---|---|---|---|---|
| R12 | −9.028 | d12= | 0.321 | | |
| R13 | −14.06 | d13= | 0.260 | nd7 1.5444 | v7 55.82 |
| R14 | −5.18 | d14= | 0.775 | | |
| R15 | −3.255 | d15= | 0.442 | nd8 1.5346 | v8 55.69 |
| R16 | 8.392 | d16= | 0.275 | | |
| R17 | ∞ | d17= | 0.110 | ndg 1.5168 | vg 64.17 |
| R18 | ∞ | d18= | 0.383 | | |

In the table, meanings of various symbols will be described as follows.

S1: aperture;
R: central curvature radius of an optical surface;
R1: central curvature radius of the object-side surface of the first lens L1;
R2: central curvature radius of the image-side surface of the first lens L1;
R3: central curvature radius of the object-side surface of the second lens L2;
R4: central curvature radius of the image-side surface of the second lens L2;
R5: central curvature radius of the object-side surface of the third lens L3;
R6: central curvature radius of the image-side surface of the third lens L3;
R7: central curvature radius of the object-side surface of the fourth lens L4;
R8: central curvature radius of the image-side surface of the fourth lens L4;
R9: central curvature radius of the object-side surface of the fifth lens L5;
R10: central curvature radius of the image-side surface of the fifth lens L5;
R11: central curvature radius of the object-side surface of the sixth lens L6;
R12: central curvature radius of the image-side surface of the sixth lens L6;
R13: central curvature radius of the object-side surface of the seventh lens L7;
R14: central curvature radius of the image-side surface of the seventh lens L7;
R15: central curvature radius of an object-side surface of the eighth lens L8;
R16: central curvature radius of an image-side surface of the eighth lens L8;
R17: central curvature radius of an object-side surface of the optical filter GF;
R18: central curvature radius of an image-side surface of the optical filter GF;
d: on-axis thickness of a lens and an on-axis distance between lenses;
d0: on-axis distance from the aperture S1 to the object-side surface of the first lens L1;
d1: on-axis thickness of the first lens L1;
d2: on-axis distance from the image-side surface of the first lens L1 to the object-side surface of the second lens L2;
d3: on-axis thickness of the second lens L2;
d4: on-axis distance from the image-side surface of the second lens L2 to the object-side surface of the third lens L3;
d5: on-axis thickness of the third lens L3;
d6: on-axis distance from the image-side surface of the third lens L3 to the object-side surface of the fourth lens L4;
d7: on-axis thickness of the fourth lens L4;
d8: on-axis distance from the image-side surface of the fourth lens L4 to the object-side surface of the fifth lens L5;
d9: on-axis thickness of the fifth lens L5;
d10: on-axis distance from the image-side surface of the fifth lens L5 to the object-side surface of the sixth lens L6;
d11: on-axis thickness of the sixth lens L6;
d12: on-axis distance from the image-side surface of the sixth lens L6 to the object-side surface of the seventh lens L7;
d13: on-axis thickness of the seventh lens L7;
d14: on-axis distance from the image-side surface of the seventh lens L7 to the object-side surface of the eighth lens L8;
d15: on-axis thickness of the eighth lens L8;
d16: on-axis distance from the image-side surface of the eighth lens L8 to the object-side surface of the optical filter GF;
d17: on-axis thickness of the optical filter GF;
d18: on-axis distance from the image-side surface of the optical filter GF to the image surface Si;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
nd6: refractive index of the d line of the sixth lens L6;
nd7: refractive index of the d line of the seventh lens L7;
nd8: refractive index of the d line of the eighth lens L8;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF.

Table 2 shows aspheric surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −9.8966E−01 | 1.7462E−02 | −9.5211E−03 | 6.5829E−02 | −1.7257E−01 | 2.6870E−01 |
| R2 | 2.4928E+01 | 7.9194E−03 | −1.4567E−03 | −1.9017E−03 | −9.3442E−04 | −5.2570E−04 |
| R3 | 5.1019E−01 | 2.5174E−03 | −4.9857E−03 | −5.1148E−03 | −1.9918E−03 | 4.5003E−04 |
| R4 | −1.4920E+02 | −5.0887E−02 | 1.9070E−01 | −4.0959E−01 | 6.3048E−01 | −7.2469E−01 |
| R5 | −7.9467E+02 | −5.7401E−02 | 2.9265E−01 | −6.0919E−01 | 9.3828E−01 | −1.0607E+00 |

TABLE 2-continued

| | | | | | | |
|---|---|---|---|---|---|---|
| R6 | 2.9327E+00 | −3.8025E−02 | 2.1026E−01 | −4.6982E−01 | 1.0119E+00 | −1.7142E+00 |
| R7 | 1.0000E+03 | 1.5657E−02 | 1.6982E−01 | −3.6566E−01 | 9.1374E−01 | −1.4420E+00 |
| R8 | 1.9232E+02 | −5.3590E−03 | 1.2145E−01 | −2.0241E−02 | −3.0425E−01 | 1.3771E+00 |
| R9 | −3.0339E+01 | −1.1897E−01 | 9.0695E−02 | −3.6841E−01 | 1.3524E+00 | −3.2220E+00 |
| R10 | −4.1179E+01 | −1.2836E−01 | 4.5648E−02 | −3.2693E−01 | 1.1064E+00 | −2.2353E+00 |
| R11 | −1.9793E+01 | −8.7291E−02 | −2.2300E−01 | 8.1785E−01 | −2.3362E+00 | 4.2603E+00 |
| R12 | 7.5045E+00 | −7.1885E−02 | −1.0353E−01 | 2.7921E−01 | −4.6351E−01 | 5.4658E−01 |
| R13 | −9.9062E+02 | −1.0933E−01 | −5.8309E−02 | 3.1207E−02 | 8.7659E−02 | −1.9198E−01 |
| R14 | 5.2484E+00 | −1.0145E−02 | −1.2089E−01 | 1.4594E−01 | −1.2082E−01 | 7.5573E−02 |
| R15 | −1.9974E+00 | −7.6926E−02 | 2.6402E−02 | −3.1751E−03 | 4.4823E−04 | −1.0986E−04 |
| R16 | −1.6659E+02 | −6.2214E−02 | 1.7640E−02 | −4.0670E−03 | 7.4975E−04 | −1.4150E−04 |

| | Conic coefficient | Aspheric surface coefficients | | | |
|---|---|---|---|---|---|
| | k | A14 | A16 | A18 | A20 |
| R1 | −9.8966E−01 | −2.5901E−01 | 1.4976E−01 | −4.7543E−02 | 6.3130E−03 |
| R2 | 2.4928E+01 | −1.9437E−04 | 2.6754E−04 | 4.8110E−06 | 9.9602E−06 |
| R3 | 5.1019E−01 | 1.0677E−03 | 4.7039E−04 | 1.1895E−05 | 1.3373E−05 |
| R4 | −1.4920E+02 | 6.2353E−01 | −3.5679E−01 | 1.1558E−01 | −1.5724E−02 |
| R5 | −7.9467E+02 | 9.0366E−01 | −5.2807E−01 | 1.7869E−01 | −2.5992E−02 |
| R6 | 2.9327E+00 | 2.2801E+00 | −1.9560E+00 | 9.0421E−01 | −1.7182E−01 |
| R7 | 1.0000E+03 | 1.6008E+00 | −1.1501E+00 | 4.5021E−01 | −6.9539E−02 |
| R8 | 1.9232E+02 | −2.9733E+00 | 3.5598E+00 | −2.2330E+00 | 5.7394E−01 |
| R9 | −3.0339E+01 | 4.9176E+00 | −4.5924E+00 | 2.3751E+00 | −5.2333E−01 |
| R10 | −4.1179E+01 | 2.7733E+00 | −2.0689E+00 | 8.4784E−01 | −1.4731E−01 |
| R11 | −1.9793E+01 | −4.8870E+00 | 3.3841E+00 | −1.2891E+00 | 2.0782E−01 |
| R12 | 7.5045E+00 | −4.3440E−01 | 2.1258E−01 | −5.5812E−02 | 5.8728E−03 |
| R13 | −9.9062E+02 | 1.9280E−01 | −1.1054E−01 | 3.3356E−02 | −3.9723E−03 |
| R14 | 5.2484E+00 | −3.2128E−02 | 8.0691E−03 | −1.0177E−03 | 5.4979E−05 |
| R15 | −1.9974E+00 | 3.0332E−05 | −3.9448E−06 | 6.6130E−08 | 1.9135E−09 |
| R16 | −1.6659E+02 | 2.5915E−05 | −2.9883E−06 | 1.9534E−07 | −5.2405E−09 |

In table 2, K is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (4)$$

Herein, x denotes a vertical distance between a point in the aspheric curve and the optical axis, and y denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of each lens of the camera optical lens 10 according to Embodiment 1. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, P7R1 and P7R2 represent the object-side surface and the image-side surface of the seventh lens L7, and P8R1 and P8R2 represent the object-side surface and the image-side surface of the eighth lens L8. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optical axis of the camera optical lens 10.

TABLE 3

| | Number(s) of inflexion points | Inflexion point position 1 | Inflexion point position 2 |
|---|---|---|---|
| P1R1 | 1 | 1.225 | / |
| P1R2 | 2 | 0.965 | 1.275 |
| P2R1 | 2 | 0.905 | 1.005 |
| P2R2 | 0 | / | / |
| P3R1 | 1 | 1.155 | / |
| P3R2 | 0 | / | / |
| P4R1 | 1 | 0.025 | / |
| P4R2 | 0 | / | / |
| P5R1 | 1 | 0.365 | / |
| P5R2 | 1 | 0.315 | / |
| P6R1 | 0 | / | / |
| P6R2 | 1 | 1.205 | / |
| P7R1 | 1 | 1.335 | / |
| P7R2 | 1 | 1.415 | / |
| P8R1 | 1 | 1.385 | / |
| P8R2 | 2 | 0.355 | 1.995 |

TABLE 4

| | Number(s) of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 0.025 |
| P4R2 | 0 | / |
| P5R1 | 1 | 0.655 |
| P5R2 | 1 | 0.535 |
| P6R1 | 0 | / |
| P6R2 | 0 | / |

TABLE 4-continued

| | Number(s) of arrest points | Arrest point position 1 |
|---|---|---|
| P7R1 | 0 | / |
| P7R2 | 0 | / |
| P8R1 | 0 | / |
| P8R2 | 1 | 0.635 |

In the subsequent Table 13, various parameters of Embodiments 1, 2 and 3 and values corresponding to the parameters specified in the above conditions are shown.

As shown in Table 13, Embodiment 1 satisfies the various conditions.

Figure 2:
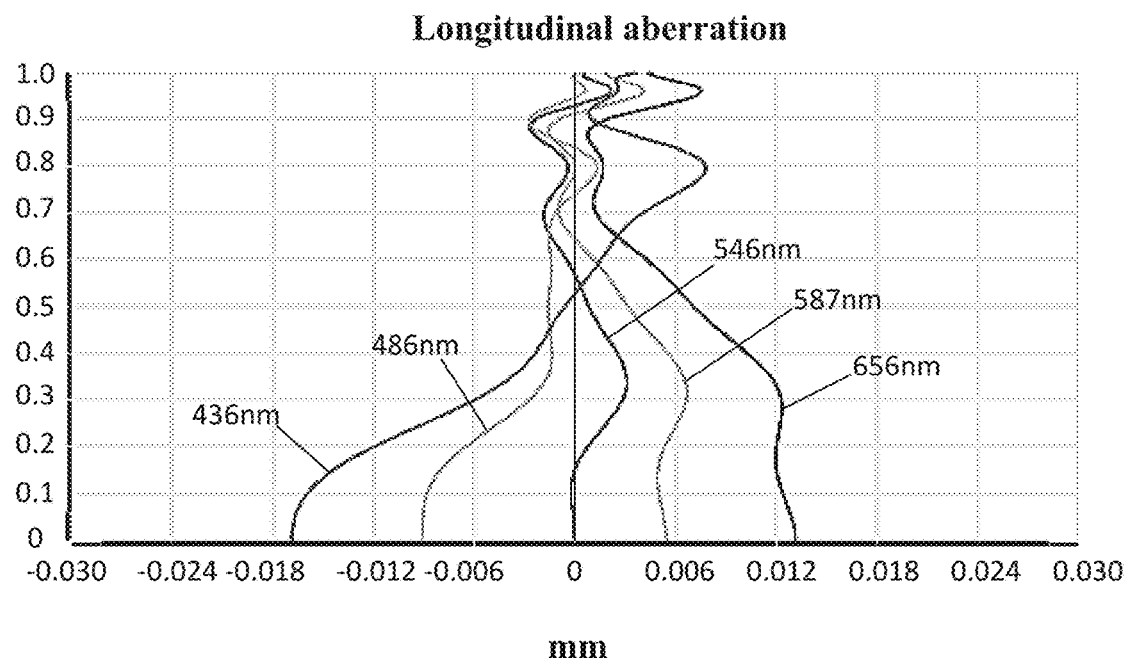
FIG. 2 is a schematic diagram of a longitudinal aberration of the camera optical lens shown in FIG. 1.
Figure 3:
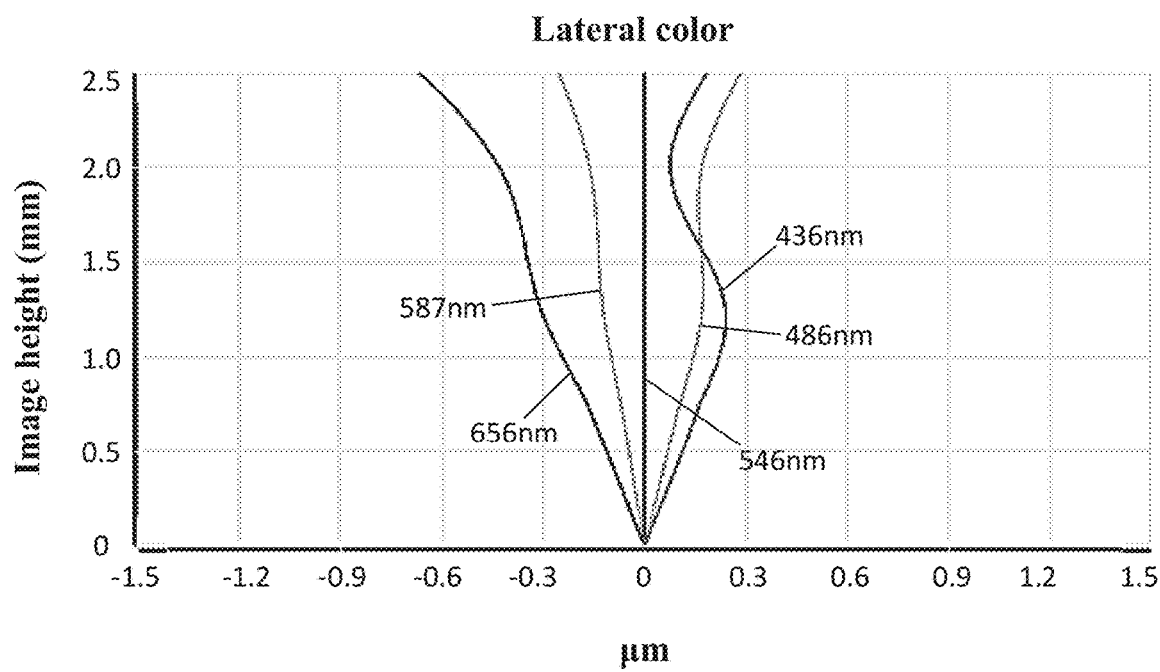
FIG. 3 is a schematic diagram of a lateral color of the camera optical lens shown in FIG. 1.
Figure 4:
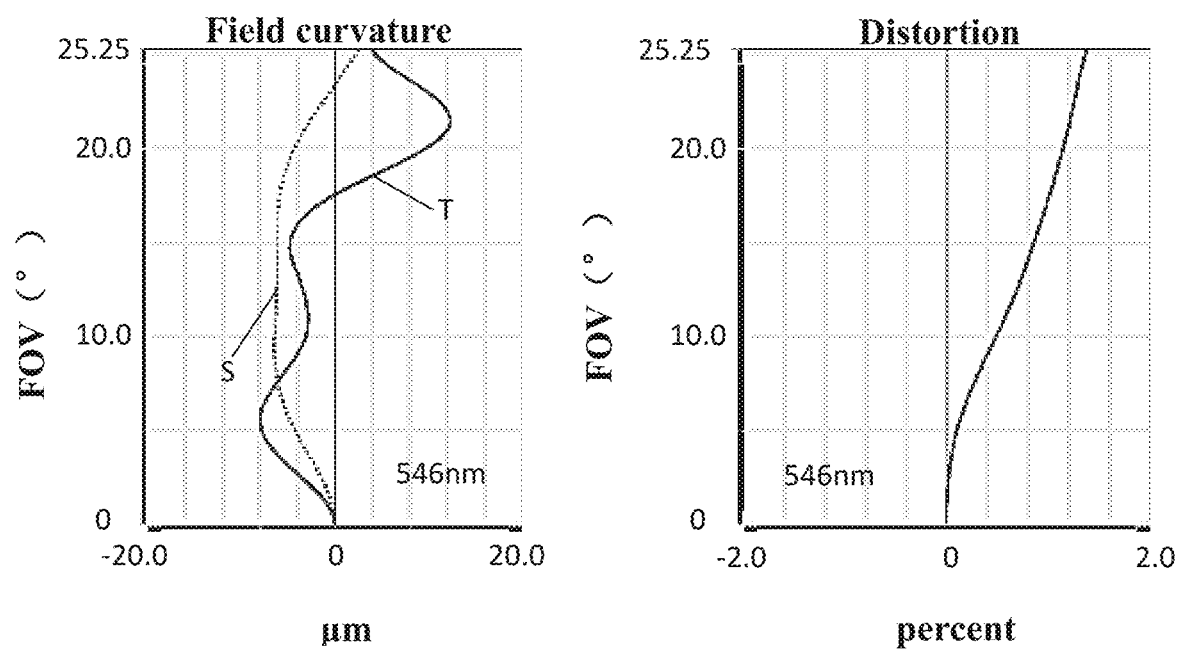
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 656 nm, 587 nm, 546 nm, 486 nm and 436 nm after passing the camera optical lens 10 in Embodiment 1, respectively. FIG. 4 illustrates a schematic diagram of a field curvature and a distortion with a wavelength of 546 nm after passing the camera optical lens 10 in Embodiment 1. A field curvature S in FIG. 4 is a field curvature in a sagittal direction, and T is a field curvature in a tangential direction.

In this Embodiment, an entrance pupil diameter (ENPD) of the camera optical lens 10 is 2.615 mm, an image height (IH) of 1.0 H is 2.500 mm, and a field of view (FOV) in a diagonal direction is 50.50°. Thus, the camera optical lens 10 achieves large aperture, ultra-thinness and long focal length, the on-axis and off-axis chromatic aberration is sufficiently corrected, thereby achieving excellent optical performance.

Embodiment 2

Figure 5:
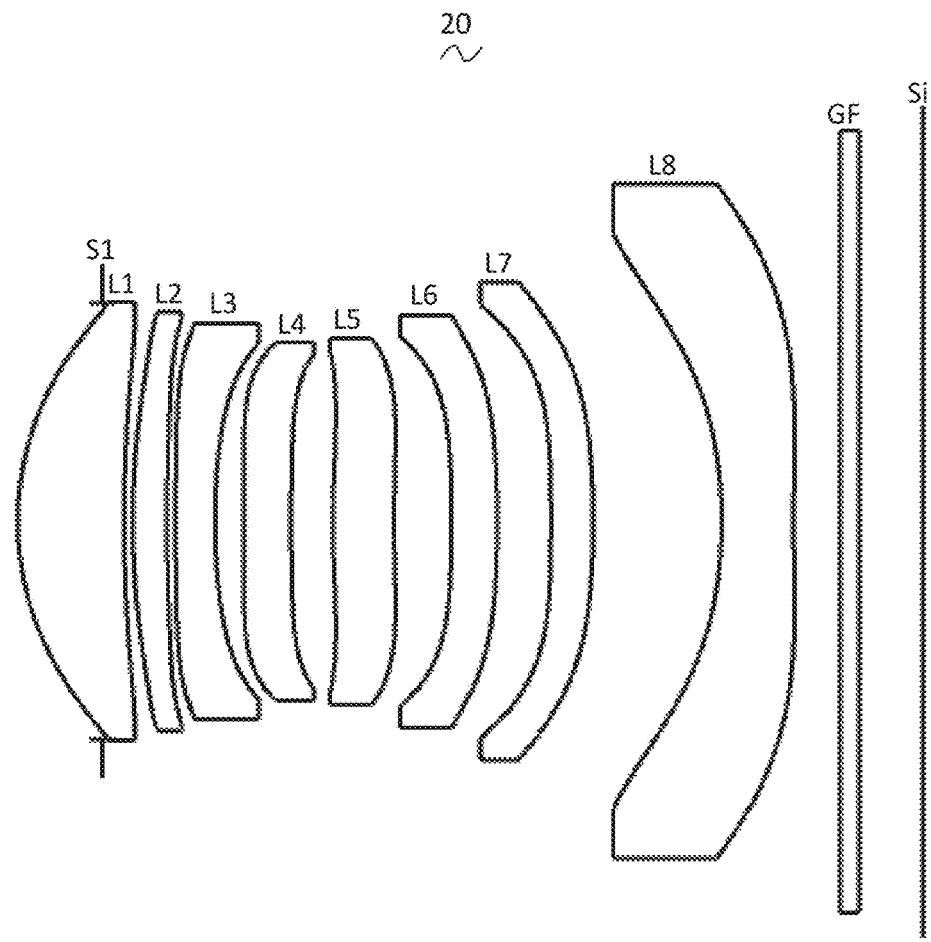
FIG. 5 is a schematic diagram of a structure of a camera optical lens according to Embodiment 2 of the present disclosure.

Embodiment 2, which provides a camera optical lens 20 structurally shown in FIG. 5, is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0= | −0.503 | | | |
| R1 | 1.748 | d1= | 0.633 | nd1 | 1.5444 | v1 | 55.82 |
| R2 | 11.095 | d2= | 0.050 | | | |
| R3 | 4.992 | d3= | 0.203 | nd2 | 1.5444 | v2 | 55.82 |
| R4 | 10.795 | d4= | 0.052 | | | |
| R5 | 22.000 | d5= | 0.229 | nd3 | 1.6701 | v3 | 19.39 |
| R6 | 3.682 | d6= | 0.172 | | | |
| R7 | −96.452 | d7= | 0.281 | nd4 | 1.5444 | v4 | 55.82 |
| R8 | 19.892 | d8= | 0.249 | | | |
| R9 | 5.376 | d9= | 0.362 | nd5 | 1.6400 | v5 | 23.54 |
| R10 | 6.611 | d10= | 0.342 | | | |
| R11 | −10.157 | d11= | 0.268 | nd6 | 1.6701 | v6 | 19.39 |
| R12 | −8.533 | d12= | 0.320 | | | |
| R13 | −13.827 | d13= | 0.250 | nd7 | 1.5444 | v7 | 55.82 |
| R14 | −5.384 | d14= | 0.762 | | | |
| R15 | −2.925 | d15= | 0.425 | nd8 | 1.5346 | v8 | 55.69 |
| R16 | 11.951 | d16= | 0.276 | | | |
| R17 | ∞ | d17= | 0.110 | ndg | 1.5168 | vg | 64.17 |
| R18 | ∞ | d18= | 0.384 | | | |

Table 6 shows aspheric surface data of each lens of the camera optical lens 20 in Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −9.9489E−01 | 1.7352E−02 | −9.4856E−03 | 6.5863E−02 | −1.7258E−01 | 2.6871E−01 |
| R2 | 2.0371E+01 | 7.1216E−03 | −1.7406E−03 | −1.9638E−03 | −9.5162E−04 | −5.2365E−04 |
| R3 | 2.0966E−01 | 1.9847E−03 | −5.0488E−03 | −5.2287E−03 | −2.0788E−03 | 4.0248E−04 |
| R4 | −1.4490E+02 | −5.0657E−02 | 1.9055E−01 | −4.0959E−01 | 6.3056E−01 | −7.2462E−01 |
| R5 | −3.4462E+02 | −5.8758E−02 | 2.9181E−01 | −6.0928E−01 | 9.3840E−01 | −1.0605E+00 |
| R6 | 2.8378E+00 | −3.8475E−02 | 2.1122E−01 | −4.6940E−01 | 1.0123E+00 | −1.7144E+00 |
| R7 | −1.0000E+03 | 1.7912E−02 | 1.7315E−01 | −3.6536E−01 | 9.1257E−01 | −1.4425E+00 |
| R8 | 2.4535E+02 | 1.3197E−03 | 1.1981E−01 | −2.0949E−02 | −3.0375E−01 | 1.3776E+00 |
| R9 | −2.9217E+01 | −1.1894E−01 | 9.2162E−02 | −3.6792E−01 | 1.3521E+00 | −3.2215E+00 |
| R10 | −4.1418E+01 | −1.2783E−01 | 4.5781E−02 | −3.2654E−01 | 1.1069E+00 | −2.2357E+00 |
| R11 | −4.2960E+01 | −8.5502E−02 | −2.2358E−01 | 8.1820E−01 | −2.3369E+00 | 4.2599E+00 |
| R12 | −1.1321E−01 | −7.0453E−02 | −1.0269E−01 | 2.7784E−01 | −4.6365E−01 | 5.4676E−01 |
| R13 | −8.8011E+02 | −1.1694E−01 | −5.9162E−02 | 3.1858E−02 | 8.8004E−02 | −1.9188E−01 |
| R14 | 6.1402E+00 | −1.4707E−02 | −1.2031E−01 | 1.4673E−01 | −1.2065E−01 | 7.5661E−02 |
| R15 | −2.5715E+00 | −7.7336E−02 | 2.5483E−02 | −3.2592E−03 | 4.7408E−04 | −9.7740E−05 |
| R16 | −4.3763E+02 | −6.4549E−02 | 1.7428E−02 | −4.0900E−03 | 7.4687E−04 | −1.4290E−04 |
| | Conic coefficient | Aspheric surface coefficients | | | | |
| | k | A14 | A16 | A18 | A20 | |
| R1 | −9.9489E−01 | −2.5900E−01 | 1.4977E−01 | −4.7547E−02 | 6.3090E−03 | |
| R2 | 2.0371E+01 | −1.8749E−04 | 2.6775E−04 | 2.5849E−06 | 5.0593E−06 | |
| R3 | 2.0966E−01 | 1.0589E−03 | 4.9303E−04 | 1.3174E−05 | 1.9052E−05 | |
| R4 | −1.4490E+02 | 6.2357E−01 | −3.5676E−01 | 1.1558E−01 | −1.5728E−02 | |
| R5 | −3.4462E+02 | 9.0374E−01 | −5.2811E−01 | 1.7867E−01 | −2.6011E−02 | |
| R6 | 2.8378E+00 | 2.2799E+00 | −1.9560E+00 | 9.0416E−01 | −1.7178E−01 | |
| R7 | −1.0000E+03 | 1.6010E+00 | −1.1503E+00 | 4.5030E−01 | −6.9500E−02 | |
| R8 | 2.4535E+02 | −2.9736E+00 | 3.5593E+00 | −2.2330E+00 | 5.7355E−01 | |
| R9 | −2.9217E+01 | 4.9182E+00 | −4.5934E+00 | 2.3752E+00 | −5.2342E−01 | |
| R10 | −4.1418E+01 | 2.7726E+00 | −2.0687E+00 | 8.4787E−01 | −1.4729E−01 | |
| R11 | −4.2960E+01 | −4.8869E+00 | 3.3837E+00 | −1.2891E+00 | 2.0819E−01 | |
| R12 | −1.1321E−01 | −4.3434E−01 | 2.1263E−01 | −5.5776E−02 | 5.8828E−03 | |
| R13 | −8.8011E+02 | 1.9278E−01 | −1.1056E−01 | 3.3355E−02 | −3.9704E−03 | |

TABLE 6-continued

| | | | | | |
|---|---|---|---|---|---|
| R14 | 6.1402E+00 | −3.2100E−02 | 8.0571E−03 | −1.0202E−03 | 5.1018E−05 |
| R15 | −2.5715E+00 | 3.2304E−05 | −4.4041E−06 | 7.6942E−08 | −1.3297E−08 |
| R16 | −4.3763E+02 | 2.5757E−05 | −2.8976E−06 | 1.9661E−07 | −3.1587E−09 |

Table 7 and table 8 show design data of inflexion points and arrest points of each lens of the camera optical lens 20 in Embodiment 2 of the present disclosure.

TABLE 7

| | Number(s) of inflexion points | Inflexion point position 1 | Inflexion point position 2 |
|---|---|---|---|
| P1R1 | 1 | 1.225 | / |
| P1R2 | 1 | 0.945 | / |
| P2R1 | 2 | 0.905 | 1.015 |
| P2R2 | 0 | / | / |
| P3R1 | 1 | 1.155 | / |
| P3R2 | 0 | / | / |
| P4R1 | 1 | 0.175 | / |
| P4R2 | 0 | / | / |
| P5R1 | 1 | 0.355 | / |
| P5R2 | 1 | 0.305 | / |
| P6R1 | 0 | / | / |
| P6R2 | 1 | 1.175 | / |
| P7R1 | 0 | / | / |
| P7R2 | 1 | 1.425 | / |
| P8R1 | 1 | 1.405 | / |
| P8R2 | 2 | 0.295 | 2.015 |

TABLE 8

| | Number(s) of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 0.275 |
| P4R2 | 0 | / |
| P5R1 | 1 | 0.645 |
| P5R2 | 1 | 0.515 |
| P6R1 | 0 | / |
| P6R2 | 0 | / |
| P7R1 | 0 | / |
| P7R2 | 0 | / |
| P8R1 | 0 | / |
| P8R2 | 1 | 0.515 |

Figure 6:
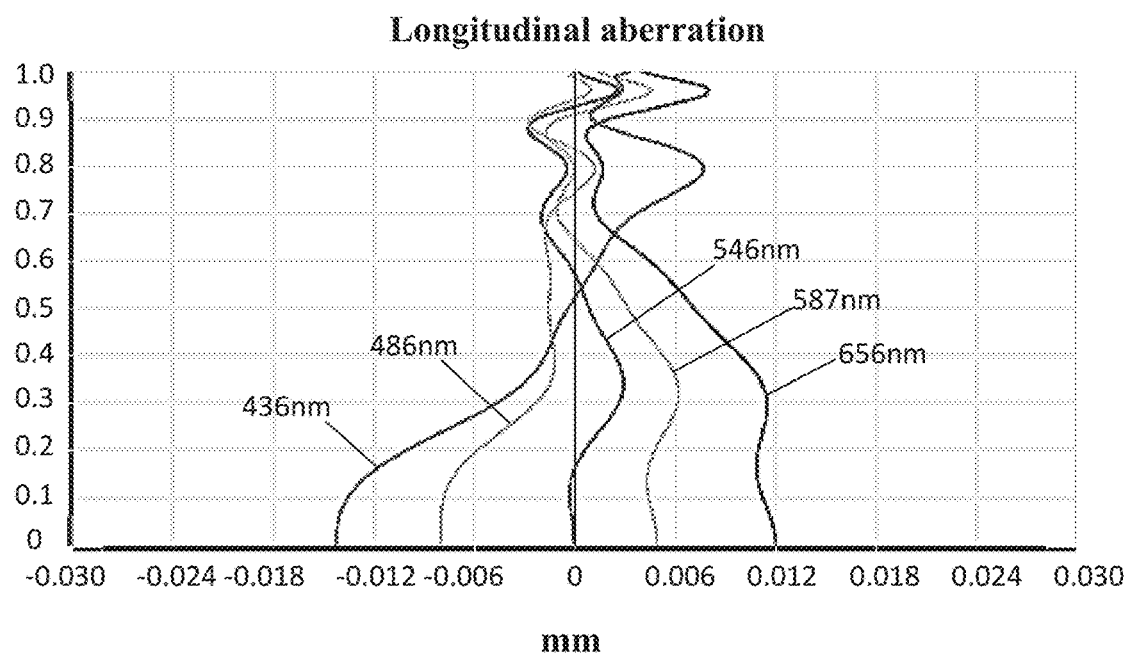
FIG. 6 is a schematic diagram of a longitudinal aberration of the camera optical lens shown in FIG. 5.
Figure 7:
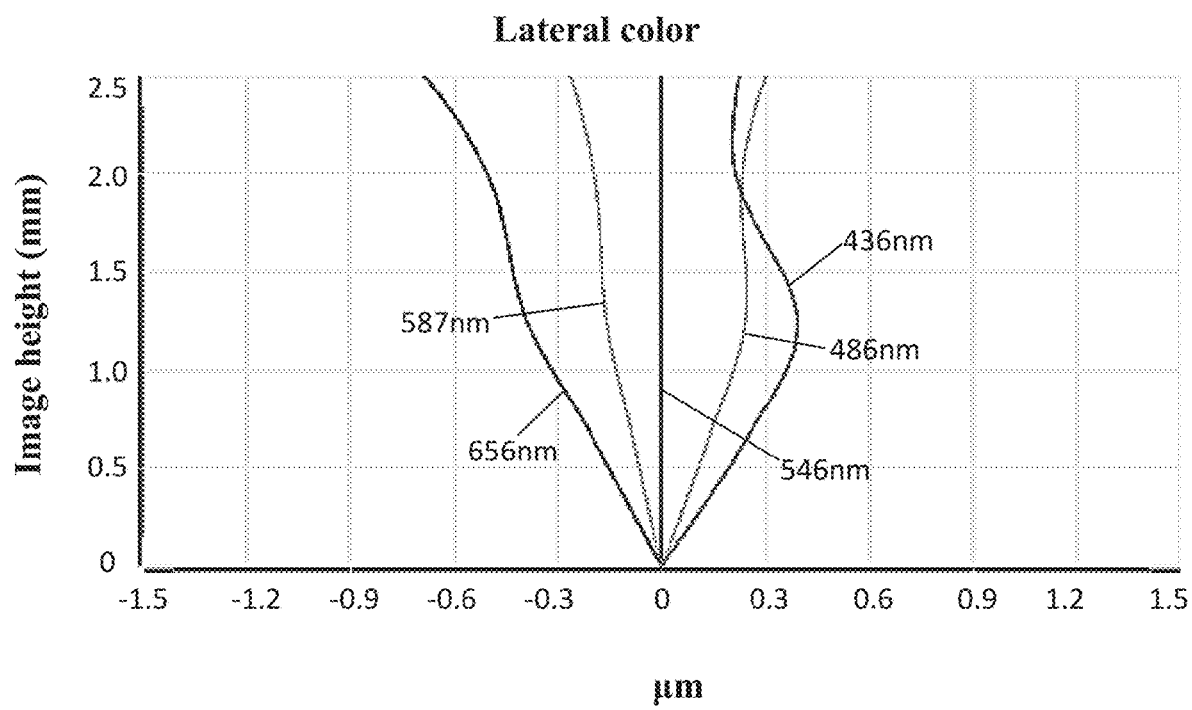
FIG. 7 is a schematic diagram of a lateral color of the camera optical lens shown in FIG. 5.
Figure 8:
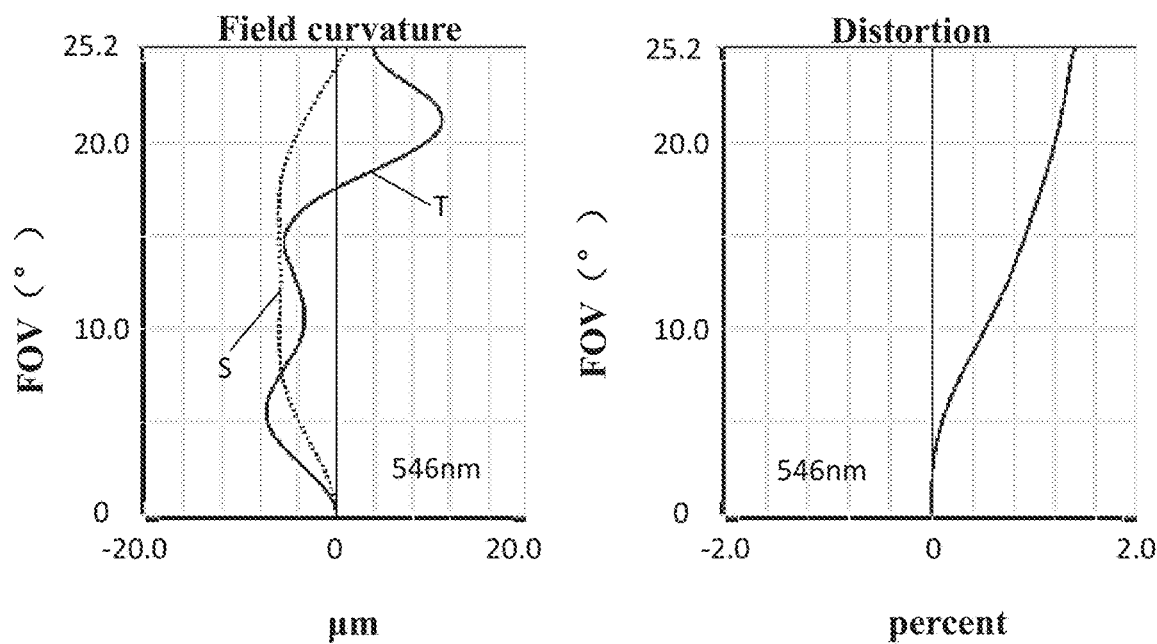
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 656 nm, 587 nm, 546 nm, 486 nm and 436 nm after passing the camera optical lens 20 in Embodiment 2, respectively. FIG. 8 illustrates a schematic diagram of a field curvature and a distortion of light with a wavelength of 546 nm after passing the camera optical lens 20 in Embodiment 2. A field curvature S in FIG. 8 is a field curvature in a sagittal direction, and T is a field curvature in a tangential direction.

As shown in the subsequent Table 13, the camera optical lens 20 in Embodiment 2 satisfies the various conditions.

In this embodiment, an entrance pupil diameter (ENPD) of the camera optical lens 20 is 2.621 mm, an image height (IH) of 1.0H is 2.500 mm, and a field of view (FOV) in the diagonal direction is 50.39°. Thus, the camera optical lens 20 achieves large aperture, ultra-thinness and long focal length, the on-axis and off-axis chromatic aberration is sufficiently corrected, thereby achieving excellent optical performance.

Embodiment 3

Figure 9:
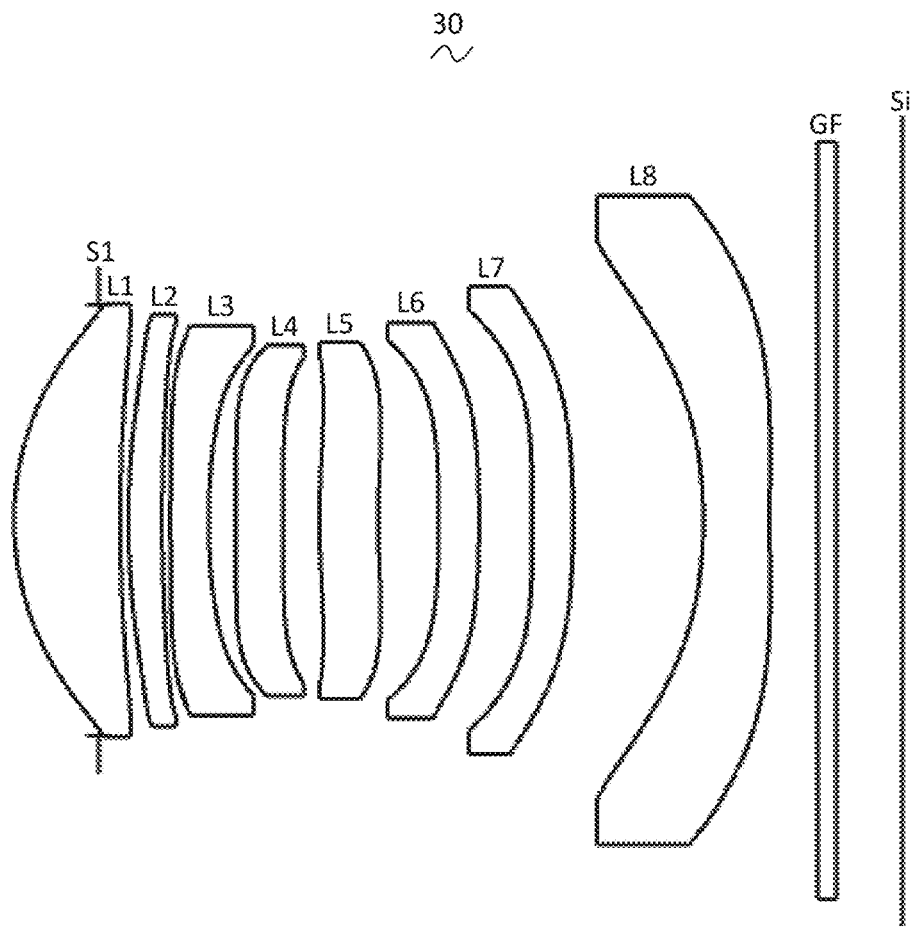
FIG. 9 is a schematic diagram of a structure of a camera optical lens according to Embodiment 3 of the present disclosure.

Embodiment 3, which provides a camera optical lens 30 structurally shown in FIG. 9, is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | vd |
|---|---|---|---|---|---|
| S1 | ∞ | d0= | −0.519 | | |
| R1 | 1.744 | d1= | 0.650 | nd1 1.5444 | v1 55.82 |
| R2 | 12.960 | d2= | 0.050 | | |
| R3 | 5.288 | d3= | 0.204 | nd2 1.5444 | v2 55.82 |
| R4 | 8.189 | d4= | 0.052 | | |
| R5 | 20.446 | d5= | 0.229 | nd3 1.6701 | v3 19.39 |
| R6 | 3.642 | d6= | 0.169 | | |
| R7 | −65.348 | d7= | 0.286 | nd4 1.5444 | v4 55.82 |
| R8 | 34.802 | d8= | 0.221 | | |
| R9 | 4.613 | d9= | 0.360 | nd5 1.6400 | v5 23.54 |
| R10 | 5.489 | d10= | 0.369 | | |
| R11 | −10.127 | d11= | 0.242 | nd6 1.6701 | v6 19.39 |
| R12 | −8.562 | d12= | 0.326 | | |
| R13 | −14.63 | d13= | 0.250 | nd7 1.5444 | v7 55.82 |
| R14 | −5.773 | d14= | 0.793 | | |
| R15 | −2.905 | d15= | 0.400 | nd8 1.5346 | v8 55.69 |
| R16 | 16.849 | d16= | 0.297 | | |
| R17 | ∞ | d17= | 0.110 | ndg 1.5168 | vg 64.17 |
| R18 | ∞ | d18= | 0.405 | | |

Table 10 shows aspheric surface data of each lens of the camera optical lens 30 in Embodiment 3 of the present disclosure.

TABLE 10

| | Conic coefficient | Aspheric surface coefficients | | | | |
|---|---|---|---|---|---|---|
| | k | A4 | A6 | A8 | A10 | A12 |
| R1 | −1.0109E+00 | 1.6940E−02 | −8.7028E−03 | 6.5551E−02 | −1.7264E−01 | 2.6872E−01 |
| R2 | 3.7192E+01 | 1.1024E−02 | −2.0467E−03 | −1.9246E−03 | −9.8004E−04 | −6.1059E−04 |
| R3 | 3.5663E−01 | 2.1313E−03 | −3.7904E−03 | −5.5363E−03 | −2.3325E−03 | 3.8775E−04 |
| R4 | −1.3885E+02 | −5.4164E−02 | 1.9001E−01 | −4.0908E−01 | 6.3062E−01 | −7.2488E−01 |
| R5 | −1.0000E+03 | −5.7512E−02 | 2.9291E−01 | −6.0966E−01 | 9.3821E−01 | −1.0603E+00 |
| R6 | 2.7283E+00 | −3.8988E−02 | 2.1063E−01 | −4.7008E−01 | 1.0143E+00 | −1.7120E+00 |
| R7 | −8.0534E+02 | 1.7197E−02 | 1.6647E−01 | −3.6147E−01 | 9.1544E−01 | −1.4423E+00 |

TABLE 10-continued

| | | | | | | |
|---|---|---|---|---|---|---|
| R8 | 7.2804E+02 | 5.3952E-03 | 1.2577E-01 | -2.2521E-02 | -3.0483E-01 | 1.3774E+00 |
| R9 | -2.2933E+01 | -1.1214E-01 | 9.2470E-02 | -3.7324E-01 | 1.3537E+00 | -3.2190E+00 |
| R10 | -2.0715E+01 | -1.2577E-01 | 4.5697E-02 | -3.2577E-01 | 1.1045E+00 | -2.2362E+00 |
| R11 | -8.7766E+00 | -8.9081E-02 | -2.2046E-01 | 8.1556E-02 | -2.3366E+00 | 4.2609E+00 |
| R12 | 2.2351E+01 | -8.0110E-02 | -1.0140E-01 | 2.7801E-01 | -4.6313E-01 | 5.4710E-01 |
| R13 | -9.9192E+02 | -1.1291E-01 | -5.9082E-02 | 3.3550E-02 | 8.8322E-02 | -1.9182E-01 |
| R14 | 3.5515E+00 | -1.0248E-02 | -1.1922E-01 | 1.4717E-01 | -1.2052E-01 | 7.5567E-02 |
| R15 | -3.5888E+00 | -7.7608E-02 | 2.4645E-02 | -3.3959E-03 | 4.4793E-04 | -1.0031E-04 |
| R16 | -9.9991E+02 | -6.5748E-02 | 1.7617E-02 | -4.1626E-03 | 7.4807E-04 | -1.4231E-04 |

| | Conic coefficient | Aspheric surface coefficients | | | |
|---|---|---|---|---|---|
| | k | A14 | A16 | A18 | A20 |
| R1 | -1.0109E+00 | -2.5900E-01 | 1.4975E-01 | -4.7542E-02 | 6.3125E-03 |
| R2 | 3.7192E+01 | -2.4387E-04 | 2.6584E-04 | 8.2102E-06 | 1.6787E-05 |
| R3 | 3.5663E-01 | 1.0659E-03 | 4.2995E-04 | 1.8157E-05 | 2.9891E-05 |
| R4 | -1.3885E+02 | 6.2338E-01 | -3.5674E-01 | 1.1562E-01 | -1.5714E-02 |
| R5 | -1.0000E+03 | 9.0394E-01 | -5.2809E-01 | 1.7866E-01 | -2.6015E-02 |
| R6 | 2.7283E+00 | 2.2810E+00 | -1.9565E+00 | 9.0390E-01 | -1.7242E-01 |
| R7 | -8.0534E+01 | 1.5999E+00 | -1.1511E+00 | 4.4991E-01 | -6.9649E-02 |
| R8 | 7.2804E+02 | -2.9731E+00 | 3.5577E+00 | -2.2326E+00 | 5.7162E-01 |
| R9 | -2.2933E+01 | 4.9176E+00 | -4.5936E+00 | 2.3738E+00 | -5.2325E-01 |
| R10 | -2.0715E+01 | 2.7739E+00 | -2.0692E+00 | 8.4789E-01 | -1.4748E-01 |
| R11 | -8.7766E+00 | -4.8868E+00 | 3.3837E+00 | -1.2893E+00 | 2.0808E-01 |
| R12 | 2.2351E+01 | -4.3429E-01 | 2.1254E-01 | -5.5776E-02 | 5.8941E-03 |
| R13 | -9.9192E+02 | 1.9277E-01 | -1.1056E-01 | 3.3353E-02 | -3.9897E-03 |
| R14 | 3.5515E+00 | -3.2165E-02 | 8.0676E-03 | -1.0244E-03 | 5.2175E-05 |
| R15 | -3.5888E+00 | 3.4116E-05 | -3.5898E-06 | 1.3292E-07 | -3.6041E-08 |
| R16 | -9.9991E+02 | 2.5600E-05 | -2.9741E-06 | 2.0189E-07 | 1.3576E-10 |

Table 11 and Table 12 show design data of inflexion points and arrest points of each lens in the camera optical lens 30 in Embodiment 3 of the present disclosure.

TABLE 11

| | Number(s) of inflexion points | Inflexion point position 1 | Inflexion point position 2 |
|---|---|---|---|
| P1R1 | 1 | 1.225 | / |
| P1R2 | 2 | 0.955 | 1.285 |
| P2R1 | 2 | 0.895 | 1.035 |
| P2R2 | 0 | / | / |
| P3R1 | 1 | 1.165 | / |
| P3R2 | 0 | / | / |
| P4R1 | 1 | 0.205 | / |
| P4R2 | 0 | / | / |
| P5R1 | 1 | 0.395 | / |
| P5R2 | 1 | 0.335 | / |
| P6R1 | 0 | / | / |
| P6R2 | 1 | 1.165 | / |
| P7R1 | 0 | / | / |
| P7R2 | 1 | 1.435 | / |
| P8R1 | 1 | 1.455 | / |
| P8R2 | 2 | 0.245 | 2.025 |

TABLE 12

| | Number(s) of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 1 | 0.315 |
| P4R2 | 0 | / |
| P5R1 | 1 | 0.715 |
| P5R2 | 1 | 0.575 |
| P6R1 | 0 | / |
| P6R2 | 0 | / |
| P7R1 | 0 | / |
| P7R2 | 0 | / |
| P8R1 | 0 | / |
| P8R2 | 1 | 0.435 |

Figure 10:
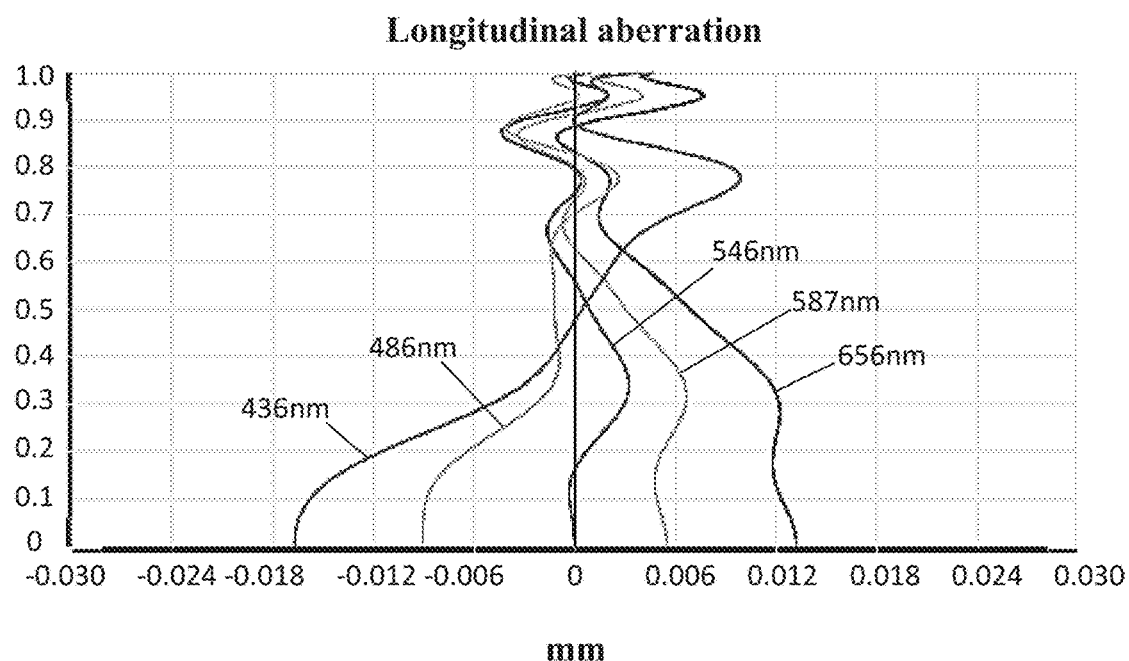
FIG. 10 is a schematic diagram of a longitudinal aberration of the camera optical lens shown in FIG. 9.
Figure 11:
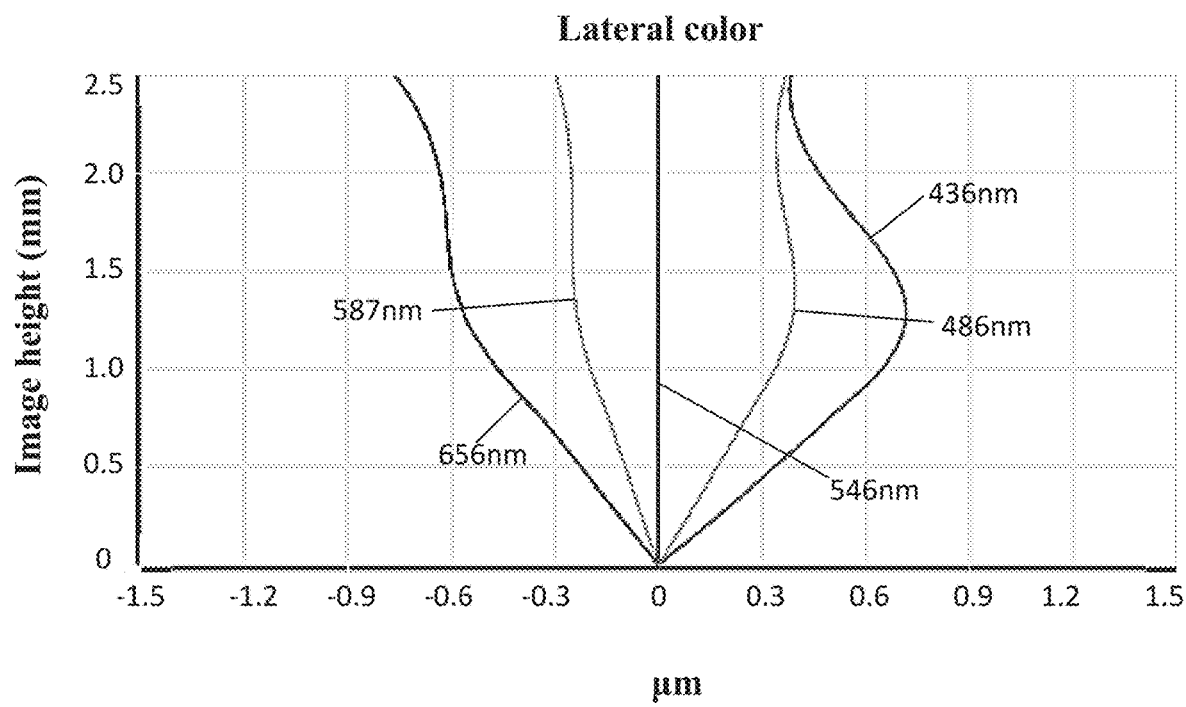
FIG. 11 is a schematic diagram of a lateral color of the camera optical lens shown in FIG. 9.
Figure 12:
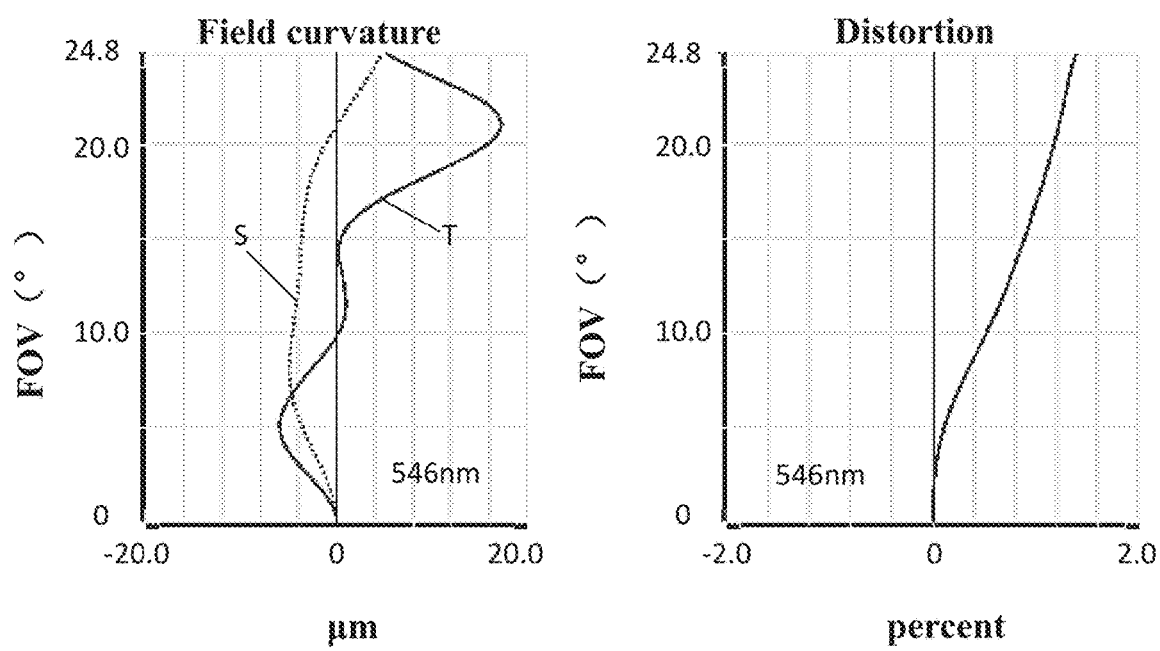
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 656 nm, 587 nm, 546 nm, 486 nm and 436 nm after passing the camera optical lens 30 in Embodiment 3, respectively. FIG. 12 illustrates a schematic diagram of a field curvature and a distortion of light with a wavelength of 546 nm after passing the camera optical lens 30 in Embodiment 3. A field curvature S in FIG. 12 is a field curvature in a sagittal direction, and T is a field curvature in a tangential direction.

As shown in the subsequent Table 13, the camera optical lens 30 in Embodiment 3 satisfies the various conditions.

In this embodiment, an entrance pupil diameter (ENPD) of the camera optical lens 30 is 2.666 mm, an image height (IH) of 1.0H is 2.500 mm, and a field of view (FOV) in the diagonal direction is 49.60°. Thus, the camera optical lens 30 achieves large aperture, ultra-thinness and long focal length, the on-axis and off-axis chromatic aberration is sufficiently corrected, thereby achieving excellent optical performance.

TABLE 13

| Parameters and conditions | Embodiment 1 | Embodiment 2 | Embodiment 3 |
|---|---|---|---|
| f/TTL | 0.97 | 0.98 | 0.99 |
| f2/f | 4.16 | 3.20 | 5.00 |
| (R7 + R8)/(R7 - R8) | 1.00 | 0.66 | 0.31 |
| f | 5.229 | 5.241 | 5.332 |
| f1 | 3.677 | 3.708 | 3.612 |

TABLE 13-continued

| Parameters and conditions | Embodiment 1 | Embodiment 2 | Embodiment 3 |
|---|---|---|---|
| f2 | 21.762 | 16.775 | 26.635 |
| f3 | −6.665 | −6.553 | −6.570 |
| f4 | −34.088 | −30.137 | −41.493 |
| f5 | 36.348 | 39.918 | 38.524 |
| f6 | 69.871 | 73.803 | 76.893 |
| f7 | 14.848 | 15.960 | 17.270 |
| f8 | −4.311 | −4.333 | −4.583 |
| f12 | 3.191 | 3.099 | 3.211 |
| FNO | 2.00 | 2.00 | 2.00 |
| TTL | 5.400 | 5.368 | 5.413 |
| FOV | 50.50° | 50.39° | 49.60° |
| IH | 2.500 | 2.500 | 2.500 |

The above-described are merely embodiments of the present disclosure. It should be noted that those of ordinary skill in the art can make improvements without departing from the inventive concept of the present disclosure, such improvements, however, fall within the protection scope of the present disclosure.

What is claimed is:

1. A camera optical lens comprising, from an object side to an image side in sequence: a first lens, a second lens, a third lens, a fourth lens, a fifth lens, a sixth lens, a seventh lens, and an eighth lens; wherein the first lens has a positive refractive power, and the camera optical lens satisfies conditions of:

$0.95 \leq f/TTL;$ $3.20 \leq f2/f \leq 5.00;$ and $0.30 \leq (R7+R8)/(R7-R8) \leq 1.00;$ where f denotes a focal length of the camera optical lens;
f2 denotes a focal length of the second lens;
R7 denotes a central curvature radius of an object-side surface of the fourth lens;
R8 denotes a central curvature radius of an image-side surface of the fourth lens; and
TTL denotes a total optical length from an object-side surface of the first lens to an image surface of the camera optical lens along an optical axis.

2. The camera optical lens according to claim 1, wherein the camera optical lens further satisfies a condition of:

$-6.00 \leq R16/R15 \leq -2.50;$ where

R15 denotes a central curvature radius of an object-side surface of the eighth lens; and
R16 denotes a central curvature radius of an image-side surface of the eighth lens.

3. The camera optical lens according to claim 1, wherein the camera optical lens further satisfies conditions of:

$0.34 \leq f1/f \leq 1.06;$ $-2.75 \leq (R1+R2)/(R1-R2) \leq -0.87;$ and $0.06 \leq d1/TTL \leq 0.18;$ where f1 denotes a focal length of the first lens;
R1 denotes a central curvature radius of the object-side surface of the first lens;
R2 denotes a central curvature radius of an image-side surface of the first lens; and
d1 denotes an on-axis thickness of the first lens.

4. The camera optical lens according to claim 1, wherein the camera optical lens further satisfies conditions of:

$-9.29 \leq (R3+R4)/(R3-R4) \leq -1.81;$ and $0.02 \leq d3/TTL \leq 0.06;$ where R3 denotes a central curvature radius of an object-side surface of the second lens;
R4 denotes a central curvature radius of an image-side surface of the second lens; and
d3 denotes an on-axis thickness of the second lens.

5. The camera optical lens according to claim 1, wherein the camera optical lens further satisfies conditions of:

$-2.55 \leq f3/f \leq -0.82;$ $0.70 \leq (R5+R6)/(R5-R6) \leq 2.16;$ and $0.02 \leq d5/TTL \leq 0.07;$ where f3 denotes a focal length of the third lens;
R5 denotes a central curvature radius of an object-side surface of the third lens;
R6 denotes a central curvature radius of an image-side surface of the third lens; and
d5 denotes an on-axis thickness of the third lens.

6. The camera optical lens according to claim 1, wherein the camera optical lens further satisfies conditions of:

$-15.56 \leq f4/f \leq -3.83;$ and $0.03 \leq d7/TTL \leq 0.08;$ where f4 denotes a focal length of the fourth lens; and
d7 denotes an on-axis thickness of the fourth lens.

7. The camera optical lens according to claim 1, wherein the camera optical lens further satisfies following conditions:

$3.48 \leq f5/f \leq 11.42;$ $-23.06 \leq (R9+R10)/(R9-R10) \leq -6.45;$ and $0.03 \leq d9/TTL \leq 0.10;$ where f5 denotes a focal length of the fifth lens;
R9 denotes a central curvature radius of an object-side surface of the fifth lens;
R10 denotes a central curvature radius of an image-side surface of the fifth lens; and
d9 denotes an on-axis thickness of the fifth lens.

8. The camera optical lens according to claim 1, wherein the camera optical lens further satisfies a condition of:

$6.68 \leq f6/f \leq 21.63;$ $5.03 \leq (R11+R12)/(R11-R12) \leq 17.91;$ and $0.02 \leq d11/TTL \leq 0.07;$ where f6 denotes a focal length of the sixth lens;
R11 denotes a central curvature radius of an object-side surface of the sixth lens;
R12 denotes a central curvature radius of an image-side surface of the sixth lens; and
d11 denotes an on-axis thickness of the sixth lens.

9. The camera optical lens according to claim 1, wherein the camera optical lens further satisfies a condition of:

$1.42 \leq f7/f \leq 4.86$;

$1.08 \leq (R13+R14)/(R13-R14) \leq 3.46$; and $0.02 \leq d13/TTL \leq 0.07$;

where
f7 denotes a focal length of the seventh lens;
R13 denotes a central curvature radius of an object-side surface of the seventh lens;
R14 denotes a central curvature radius of an image-side surface of the seventh lens; and
d13 denotes an on-axis thickness of the seventh lens.

10. The camera optical lens according to claim 1, wherein the camera optical lens further satisfies a condition of:

$-1.72 \leq f8/f \leq -0.55$;

$-1.41 \leq (R15+R16)/(R15-R16) \leq -0.29$; and $0.04 \leq d15/TTL \leq 0.12$;

where
f8 denotes a focal length of the eighth lens;
R15 denotes a central curvature radius of an object-side surface of the eighth lens;
R16 denotes a central curvature radius of an image-side surface of the eighth lens; and
d15 denotes an on-axis thickness of the eighth lens.

\* \* \* \* \*